Figure 1:
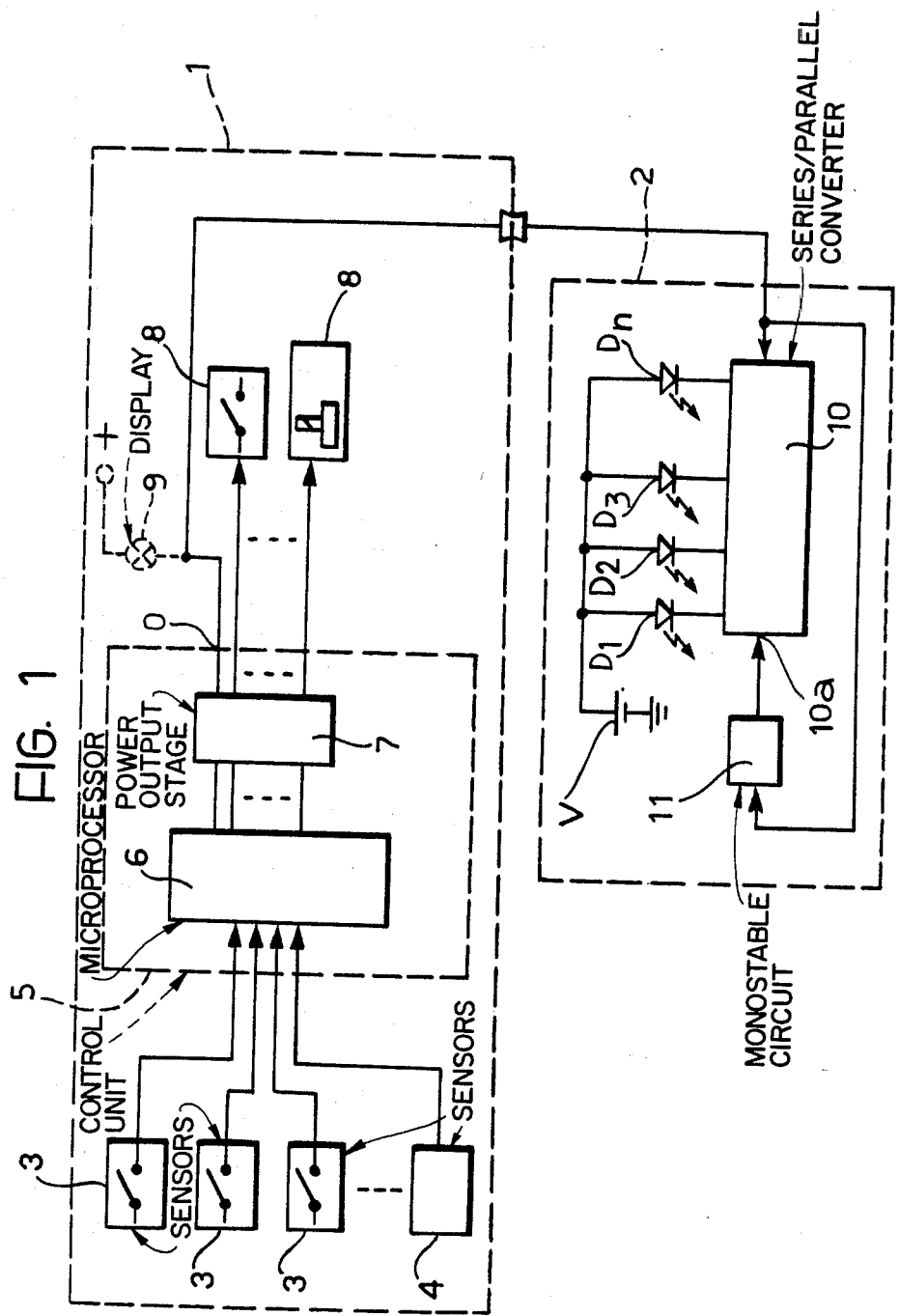

United States Patent [19]

Guagliumi et al.

[11] Patent Number: 4,561,296
[45] Date of Patent: Dec. 31, 1985

[54] DIAGNOSTIC DEVICE FOR A SYSTEM FOR CONTROLLING THE STOPPING AND RESTARTING OF A INTERNAL COMBUSTION ENGINE FOR MOTOR VEHICLES

[75] Inventors: Renato Guagliumi, Turin; Oscar Blazic, S.Ambrogio, both of Italy

[73] Assignee: Marelli Autronica S.p.A., Pavia, Italy

[21] Appl. No.: 661,728

[22] Filed: Oct. 17, 1984

[51] Int. Cl.⁴ .......................................... G01M 15/00
[52] U.S. Cl. ..................................................... 73/118
[58] Field of Search ...................... 73/117.3, 116, 118; 123/179 R, 179 K; 290/DIG. 3, 30 R, 51

[56] References Cited

U.S. PATENT DOCUMENTS 3,514,621 5/1970 Farmer et al. ............... 123/179 A X
4,481,425 11/1984 Hori et al. ..................... 290/DIG. 3

Primary Examiner—Jerry W. Myracle
Attorney, Agent, or Firm—Frishauf, Holtz, Goodman & Woodward

[57] ABSTRACT

The device allows the monitoring and diagnosis of the functioning of a system for controlling the stopping and restarting of an internal combustion engine for motor vehicles, comprising a plurality of electrical sensors which output two-level signals indicative of the condition of members which control the running of the engine and/or of respective controlled parameters or ranges, and an electronic monitoring and control unit with a microprocessor, connected at its input to the sensors and at its output to actuators for causing the engine to stop and restart. The diagnostic device comprises an interrogation device for carrying out a succession of sequential cyclical scans of the outputs of at least some of the sensors, and for generating, at each scan, a serial signal comprising a plurality of two-level signal portions, each indicative of the level of signal produced at the output of the respective sensor. A signalling device is electrically connectible to the interrogation device to convert the portions of the serial signal into corresponding perceptible signals and permit the functioning of the stop-start system to be monitored and diagnosed.

6 Claims, 2 Drawing Figures

DIAGNOSTIC DEVICE FOR A SYSTEM FOR CONTROLLING THE STOPPING AND RESTARTING OF A INTERNAL COMBUSTION ENGINE FOR MOTOR VEHICLES

DESCRIPTION

The present invention relates to a diagnostic device for a system for controlling the stopping and restarting ('stop-start') of an internal combustion engine for motor vehicles, comprising a plurality of electrical sensor means for producing two-level electrical signals indicative of the condition of members which control the running of the engine (for example, the gear lever, clutch pedal, etc) and/or of respective monitored parameters or ranges (for example, the engine temperature), and an electronic monitoring and control unit with a microprocessor, connected at input to the sensor means and at output to actuating means (switches in the ignition circuit and in the supply circuit for the starter motor, solenoid valves for interrupting the fuel supply, etc.) for causing the engine to stop and start.

The object of the present invention is to provide a diagnostic device by means of which it is possible to carry out quickly and rapidly both monitoring of the running of the engine and, in particular, diagnosis of the causes of any malfunctions of such a system.

This object is achieved according to the invention by means of a device of the aforesaid type, characterized in that it includes interrogation means for carrying out a succession of sequential cyclical scans of the outputs of the sensor means, and for generating at each scan, and producing at a pre-arranged output, a serial signal comprising a plurality of two-level signal portions, each indicative of the level of the signal produced at the output of a respective sensor means, and in that it further includes a separate signalling device which is electrically connectible to the interrogation means for converting the successive portions of the serial signal into corresponding perceptible signals.

Figure 2:
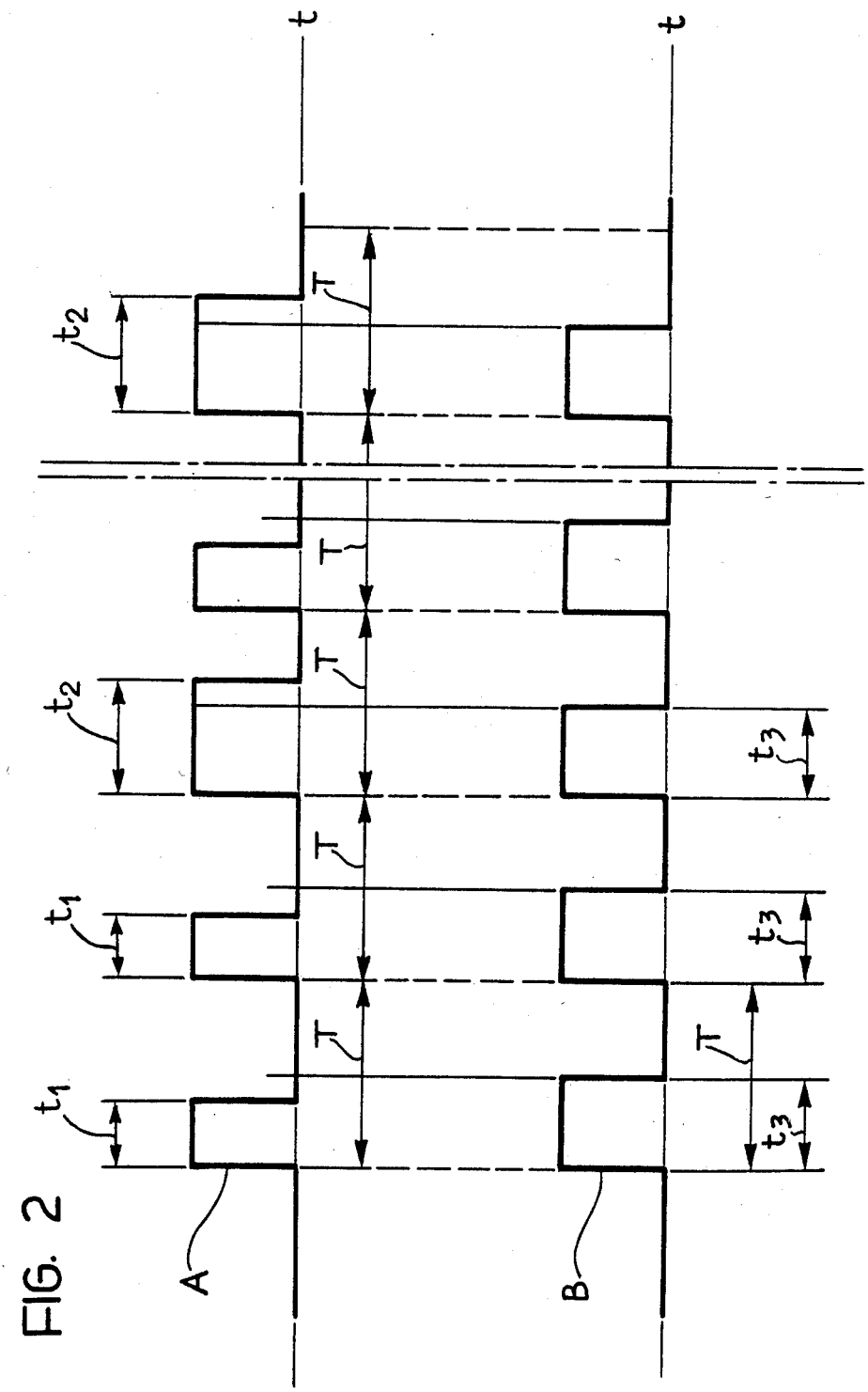

Further characteristics and advantages of the device according to the invention will become apparent in the detailed description that follows with reference to the appended drawings, provided purely by way of non-limiting example, in which:

FIG. 1 is a partial block circuit diagram of a device for controlling the stopping and restarting of an engine, equipped with a diagnostic device according to the invention, and FIG. 2 shows the waveform of two signals generated in operation by the device according to the invention.

With reference to FIG. 1, a system 1 for controlling the stopping and restarting of the internal combustion engine of a motor vehicle comprises, in known manner, a plurality of electrical sensors indicated 3, for example, switches functioning as position sensors, and 4 for example, threshold temperature sensors. The sensors 3, 4 are connected to an electronic monitoring and control unit, generally indicated 5, having a microprocessor. This unit may comprise, for example, a microcomputer 6 of the so-called "single chip" type, and a power output stage 7 having its inputs connected to the outputs of the microcomputer 6 and its outputs connected to actuating devices 8 and any display devices 9. The actuating devices 8 may comprise, for example, electrically-controlled switches located in the ignition circuit of the engine and in the supply circuit for the starter motor of the engine, and solenoid valves for shutting off the fuel supply pipe to the engine. The display devices 9 may comprise pilot lamps or light-emitting diodes mounted on the instrument panel of the motor vehicle to signal the operating state of the stop-start device and, hence, of the engine of the motor vehicle.

In addition to the standard programmes incorporated to ensure the normal functioning of the stop-start system, the microcomputer 6 according to the invention is preset to implement a monitoring and diagnosing programme in which there is carried out a succession of sequential cyclical scans of the outputs of the sensors 3, 4 and also, if necessary, of at least some of its own output connected to the actuators 8, for generating at each scan, and producing at a pre-arranged output (the output indicated 0 in FIG. 1, to which a display device is connected in the example illustrated), a serial signal having substantially a waveform such as that indicated A in FIG. 2. Each portion of the serial signal has a duration T (FIG. 2) and is indicative of the level of the signal produced at the output of a corresponding sensor 3 or 4, or by a corresponding output of the monitoring and control unit 5. In particular, according to the invention, each portion of the serial signal comprises a first "high" level part followed by a second "low" level part. The duration of the first part can assume a first value $t_1$ or a second value $t_2$, with $t_1 < t_2 < T$. Each portion of the serial signal A with the part at level "1" having a duration $t_1$ indicates that the output of the corresponding sensor or corresponding output of the monitoring and control unit 5 is at level "0". Each portion of the serial signal A of which the first part has a duration $t_2$ indicates that the output of the corresponding sensor 3 or 4, or the corresponding output of the monitoring and control unit 5, is at level "1".

With the coding procedure described above, the waveform A shown in FIG. 2 corresponds to the following sequence "0", "0", "1", "0" and "1".

The diagnostic device according to the invention comprises a movable part 2, including a series/parallel convertor 10 intended to be electrically connected to the putput 0 of the monitoring and control unit 5 so as to effect the electrical connection of the movable part 2 to the control system 1. Light-emitting diodes $D_1$ to $D_n$ are connected in order to the outputs of the series/parallel convertor. The number n of diodes is equal to the number of sensors 3 or 4 and outputs of the monitoring and control unit 5, which are interrogated by the microcomputer 6 during each cyclical scan.

In the example illustrated, the light-emitting diodes $D_1$ to $D_n$ have their anodes connected to the positive pole of a d.c. voltage source V constituted, for example, by the battery of the motor vehicle.

The series/parallel convertor 10 incorporates an input 10a for controlling the conversion, to which is connected the output of a monostable control circuit 11. The latter has its input connected to the input of the series/parallel converter, and it therefore receives the serial signal A transmitted to the convertor.

This monostable circuit is preset to produce a signal which changes to a "high" level each time the signal fed to its input has an ascending front, and remains at the "high" level for a duration $t_3$ between $t_1$ and $t_2$. In FIG. 2, the waveform B represents the waveform of the signal output by the monostable circuit 11 in operation, and supplied to the conversion control input 10a of the series/parallel convertor 10. At each descending front of the signal B, the series/parallel convertor 10 converts the serial signal A. Since, as stated, the characteristic duration of the monostable circuit 11 lies between $t_1$ and $t_2$, the portion of serial signal A illustrated in FIG. 2 is reconverted to the sequence 00101. This sequence represents the states of the outputs of the series/parallel convertor when the portion of the serial signal A shown in FIG. 2 is converted into a parallel form.

Correspondingly, the light-emitting diodes associated with the first, second and the fourth portions of the serial signal receive a current, while the diodes associated with the third and last portions of the serial signal shown in FIG. 2 remain unlit.

Thus, the light-emitting diodes D connected to the series/parallel convertor provide an instant visual indication of the state of the monitored outputs of the sensors and the monitoring and control unit 5. With a view to carrying out monitoring and diagnosis, it is possible, once the movable part 2 has been connected to the fixed part 1, to bring about a change in the state of the output of each of the sensors and the outputs of the monitoring and control unit 5. Thus, for example, the clutch pedal can be pressed and then released. Through the effect of this operation, if the position sensor associated with the pedal is functioning correctly, the light-emitting diode D associated with the sensor should go out and then light up again (or vice versa), changing state when the pedal is released after being pressed.

It is thus possible to proceed to monitor the correct functioning of all the monitored sensors and outputs of the monitoring and control unit 5.

The particular manner of coding of the serial signal (which is substantially a duty cycle modulation) allows the structure of the movable part to be extremely simple.

The microcomputer 6 is programmed to carry out the aforementioned succession of sequential cyclical scans using entirely conventional techniques which will not therefore be described further.

Furthermore, it is self-evident that the solution disclosed above, in which the cyclical scans of the outputs of the sensors and electronic monitoring and control unit are carried out by the electronic monitoring and control unit itself, appropriately programmed as necessary, represents the most suitable solution in that it does not necessitate any additional hardware for carrying out the scans. However, it is still possible to achieve the same results, albeit in a less convenient manner, by providing circuitry suitably adapted for the scanning process, for example including a multiplexor.

The output 0 from which the serial signal A is obtainable may be constituted by an otherwise unused output of the electronic monitoring and control unit 5 or, if no unused output is available, as in the example illustrated, use can be made of an output already intended for other purposes, for example, for controlling a light-emitting indicator.

In this case, the serial signal is superimposed on the control signal of the indicator. So as not to interfere with the functioning of the indicator, the serial signal should have a very restricted duration for each scan (for example 2 milliseconds), whereby it cannot cause a perceptible activation of the light-emitting indicator when the latter is unlit, and cannot cause the indicator to be perceptibly extinguished when it is lit.

We claim:

1. A diagnostic device for a system for controlling the stopping and restarting of an internal combustion engine for motor vehicles, comprising actuating means for causing the engine to stop and start, a plurality of electrical sensor means for outputting two-level electrical signals indicative of the running conditions of the engine, and an electronic monitoring and control unit with a microprocessor, having input connections to said sensor means and output connections to said actuating means,
   wherein said device comprises:
   interrogation means for carrying out a succession of sequential cyclical scans of the outputs of said sensor means, and for generating at each scan, and producing at a pre-arranged output, a serial signal comprising a plurality of two-level signal portions, each indicative of the level of the signal output by a respective said sensor means, and
   a separate signalling device which is electrically connectible to said interrogation means for converting the successive portions of said serial signal into corresponding perceptible signals.

2. A device as defined in claim 1, wherein the control system includes signalling devices and said electronic monitoring and control system is preset to output two-level control signals for said actuating means and said signalling devices, and wherein said interrogation means are preset to carry out a succession of sequential cyclical scans of the outputs of said sensor means and of one or more outputs of said monitoring and control unit, and to generate and output a serial signal comprising successive two-level signal portions indicative of the level of the signals output by the respective sensor means and the respective output of said monitoring and control unit.

3. A device as defined in claim 2, wherein said signalling device includes display means for providing visual indications corresponding to the signal portions of said serial signal.

4. A device as defined in claim 3, wherein said signalling device comprises a series/parallel convertor having an input connectible to said pre-arranged output of the interrogation means, and a plurality of light-emitting diodes connected to, and controlled by, corresponding outputs of the series/parallel convertor.

5. A device as defined in claim 4, wherein:
   said interrogation means can generate a serial signal with individual portions which have an identical duration and comprise a first "high" level part followed by a second "low" level part, said first part having a first or second greater duration when the serial signal portion indicates that the signal produced by the respective scanned output occurs at the first or second level, and
   said signalling device includes a monostable circuit having a control input connectible to the said pre-arranged output of the interrogation means and an output connected to the conversion control input of said series/parallel convertor, said monostable circuit being preset to output a signal with a duration between said first and second durations.

6. A device as defined in claim 1, wherein the monitoring and control unit includes a microprocessor which constitutes said interrogation means.

* * * * *